US007143935B2

(12) United States Patent
Marta

(10) Patent No.: US 7,143,935 B2
(45) Date of Patent: Dec. 5, 2006

(54) MACHINE FOR THE MECHANICAL PERSONALIZATION OF SUPPORTS OF THE IDENTIFICATION CARD TYPE

(75) Inventor: Federico Marta, Cambiago (IT)

(73) Assignee: Fractalos S.R.L., Cambiago (IT)

( * ) Notice: Subject to any disclaimer, the term of this patent is extended or adjusted under 35 U.S.C. 154(b) by 189 days.

(21) Appl. No.: 10/858,862

(22) Filed: Jun. 1, 2004

(65) Prior Publication Data

US 2005/0017069 A1 Jan. 27, 2005

(30) Foreign Application Priority Data

May 30, 2003 (IT) .......................... MI2003A1083

(51) Int. Cl.
*G06K 5/00* (2006.01)

(52) U.S. Cl. ...................................................... 235/380

(58) Field of Classification Search ................. 235/380
See application file for complete search history.

(56) References Cited

U.S. PATENT DOCUMENTS 5,090,554 A * 2/1992 De Sanctis ................. 196/414
5,701,727 A * 12/1997 Lundstrom et al. ........... 53/569
5,814,796 A * 9/1998 Benson et al. .............. 235/375

* cited by examiner

*Primary Examiner*—Daniel St.Cyr
(74) *Attorney, Agent, or Firm*—Graybeal Jackson Haley LLP

(57) ABSTRACT

A machine for the mechanical personalization of supports of the type identification card, comprising a mechanical personalization group of the cards adapted to interact with a card to be mechanically personalized so as to form, on a surface of the card, strings of symbols, and a moving and positioning device of the cards to be mechanically personalized with respect to the mechanical personalization group. The moving and positioning device of the cards includes a pair of elements belt-like extending and jointly movable along a first direction of a plane containing the card to be personalized, said belt-like elements being arranged at a mutual distance, in a second direction orthogonal to the plane, such as to allow said pair of belt-like elements to receive, accommodate and hold therebetween by friction the card.

9 Claims, 11 Drawing Sheets

MACHINE FOR THE MECHANICAL PERSONALIZATION OF SUPPORTS OF THE IDENTIFICATION CARD TYPE

PRIORITY CLAIM

This application claims priority from Italian patent application No. MI2003A001083, filed May 30, 2003, which is incorporated herein by reference.

FIELD OF THE INVENTION

The present invention relates in general to the field of the manufacturing of supports intended to constitute to identification cards, such as for example credit cards, bank debiting cards (i.e. cards usable in Automatic Teller Machine, Point Of Sale payment and similar apparatuses), membership cards, fidelity cards and the like.

Particularly, the invention relates to machines used for the operations of mechanical personalization of such supports, where by mechanical personalization there is intended the realization, on such supports, typically cards of plastic material, of strings of alphabetical and/or numerical characters, or, in general, of symbols engraved in relief on the surface of the plastic card.

BACKGROUND OF THE INVENTION

In the field of the credit cards and the debit cards, the migration is going on from the use of cards provided with a magnetic band for the storage of sensitive data, to the use of cards in which such information is instead memorized in an electronic microcircuit (that, usually, includes an electrically programmable non-volatile semiconductor memory) integrated in a small chip of semiconductor material, in turn embedded in the card. Compared to cards with magnetic band, the cards provided with microcircuit are as a matter of fact "smarter" (for this reason, in jargon, they are referred to as "smart cards") and ensure an increased security, and are therefore deemed preferable to the former by all the most important suppliers of services of credit payment (Visa, Mastercard, American Express) and debit payment, including bank institutes.

It is therefore predictable that, during the next two or three years, the vast majority of the credit/debit cards currently circulating, provided with magnetic band, will be replaced by microcircuit-based identification cards.

It appears therefore that, in order to be capable of facing the predictable increase of demand, the firms operating in the field of manufacturing of the supports destined to constitute credit/debit cards would have great benefit if the operating speed of the current manufacturing equipments of such supports were increased.

Particularly, it is foreseen that also the new cards, as the current ones, will have to carry a "mechanic" type personalization, consisting in strings of alphabetical or numerical characters or, in general, of symbols, usually realized by embossing (i.e., in relief on the active surface of the card), carrying for example the card holder name, the card number and the expiry date thereof.

The embossing operation is typically performed through so-called "drum-like" embossing machines, that comprise a characters-supporting drum, revolving about a vertical axis, and in which two circumferential successions of seats are realized, in proximity of two vertically-facing peripheral edges of the drum, and among which a groove is interposed, adapted to receive a card to be mechanically personalized, in a position lying on a horizontal plane. Each seat houses in a sliding way along the drum axis a punch block or a matrix block, conjugated to each other, activatable by means of suitable percussion members. By inserting the card to be submitted to embossing, lying on a horizontal plane, into the groove of the drum, and by rotating the drum so as to select the desired character, the activation of the respective punch-matrix pair causes the embossing of the selected character on the surface of the card.

While the selection of the different symbols to be realized on the card is carried out by rotating the characters-supporting drum about its axis, the selection of the points on the card surface where such symbols have to be realized is performed moving the card with respect to the drum in the plane where the card lies. A known solution for moving the card in the plane where the card lies, and for positioning the card with respect to the characters-supporting drum, calls for using elements like tweezers, typically in metallic material, moving integrally to a carriage that is movable along two orthogonal directions in the horizontal plane in which the card lies, parallel respectively to the longer side and the shorter side of the card.

The card, coming for example from a "virgin" cards feeder, or from an upstream manufacturing station, such as for example a station of magnetic personalization of the card, is received and grabbed by the tweezers, which needs to be preliminary brought into a load position of the new card. Once the new card has been grabbed by the tweezers, the mechanical personalization phase is started; during such a phase, the carriage that supports the tweezers is properly moved along the X axis and the Y axis, under the control of an electronic control unit, so as to bring each time the desired point of the card surface under the characters-supporting drum that, made to rotate still under the control of the control unit, positions the punch-matrix pair corresponding to the desired character in correspondence of such card surface point. The activation of the punch-matrix pair thus determines the embossing of the desired character, in that point of the card surface. The process is repeated for all the characters to be engraved on the card.

At the end of the mechanical personalization, the card, still held by the tweezers, which are moved by the respective carriage, is brought into an unloading position, from which the card is taken in charge by the manufacturing station downstream or, if the manufacturing is finished, is expelled. Only after the card has been unloaded can the tweezers be brought, by the respective carriage, back into the load position, so as to be ready to grab the new card to be personalized.

The Applicant has observed that this solution shows significant limitations in terms of operating speed; particularly, in order to be able to load a new card to be mechanically personalized, it is not only necessary that the process of mechanical personalization of the preceding card be completed, but also that the personalized card be already unloaded, and that, once the personalized card has been unloaded, the tweezers are brought, from the card unloading position, back into the card loading position. It thus normally occurs that a new card to be personalized has to wait at the entry of the embossing station, despite the embossing operation of the preceding card has already been completed. These dead times have a negative impact on the productivity of the machine, and constitute a bottleneck against the increase of the productivity of the manufacturing plants of the cards.

Moreover, in order to be able to hold the card during its processing, the tweezers are normally provided with grab elements, typically in the form of small teeth, that, due to the pressure that needs to be exerted for holding the card during its processing, inevitably leave undesired scraps and imprints on the finished card. The Applicant has ascertained that this results particularly undesirable.

SUMMARY OF THE INVENTION

In view of the state of the art outlined in the foregoing, it has been therefore an object of the present invention to devise improvements to the known mechanical personalization machines of the supports for identification cards such as credit/debit cards, particularly with the purpose of increasing the operating speed thereof, and therefore to increase the productivity, and to improve the quality of the end product.

In accordance with the present invention, this and other objects are attained thanks to the mechanical personalization machine of supports of the identification card type defined in the appended claim 1.

The machine includes a card mechanical personalization group, for example an embossing group or an incision and inking group, adapted to interact with a card to be mechanically personalized so as to realize, on the card, strings of symbols, for example by means of embossing or by incision and inking, through an inking ribbon, and a moving and positioning device of the to card to be mechanically personalized with respect to the mechanical personalization group.

The moving and positioning device of the card includes a pair of belt-like elements, extended and jointly movable along a first direction of a plane containing the card to be personalized, and arranged at a mutual distance, in a second direction orthogonal to said plane, such as to allow said pair of belt-like elements to receive, to accommodate and to hold therebetween, by friction, the card to be personalized.

BRIEF DESCRIPTION OF THE DRAWINGS

The features and the advantages of the present invention will be made apparent by the following detailed description of some embodiments thereof, provided merely by way of non-limiting examples, description that will be conducted making reference to the annexed drawings, wherein.

DETAILED DESCRIPTION OF PREFERRED EMBODIMENTS OF THE INVENTION

Figure 1:
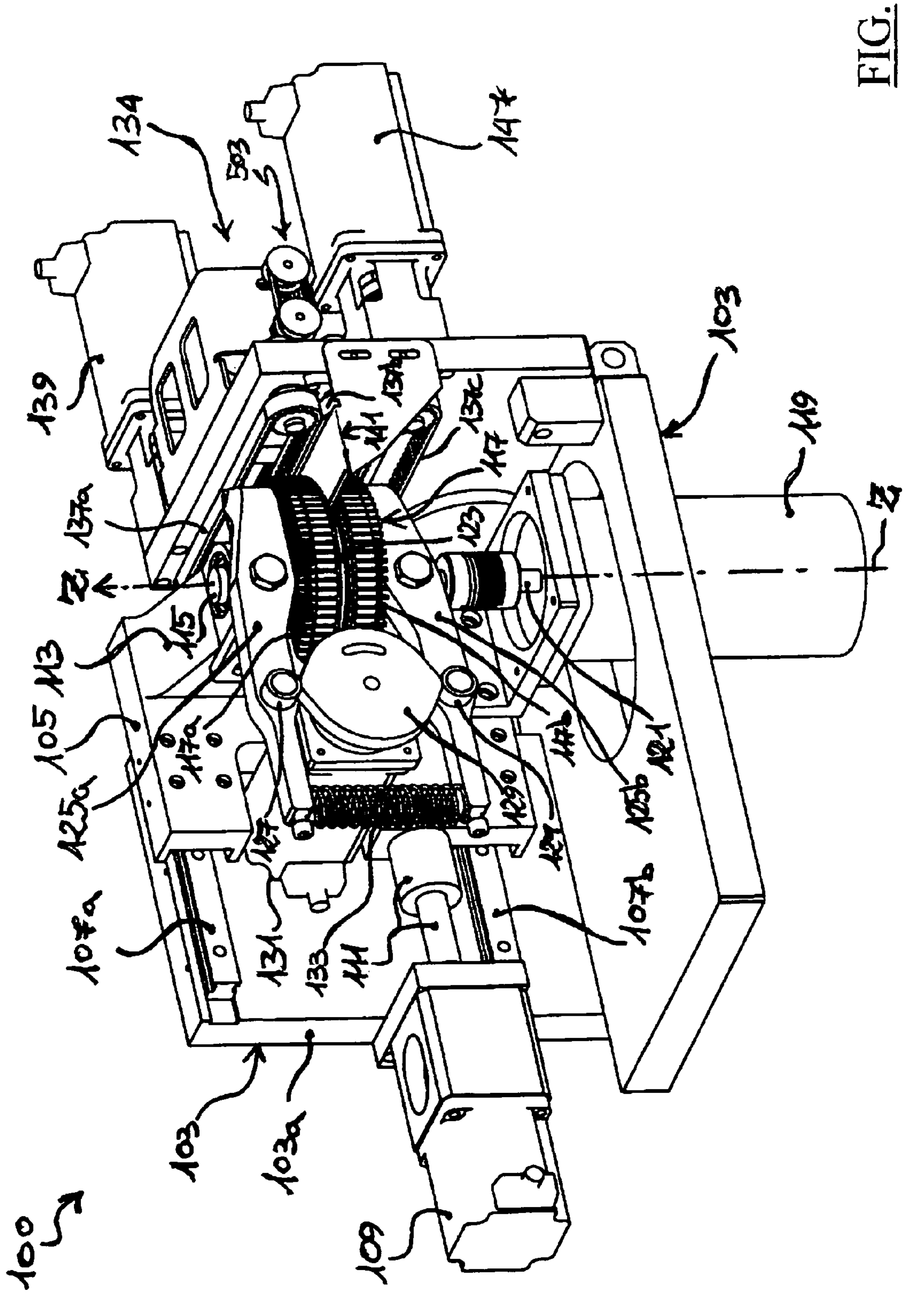
FIG. 1 is a schematic, global axonometric view of a card mechanical personalization unit according to an embodiment of the present invention.
Figure 2:
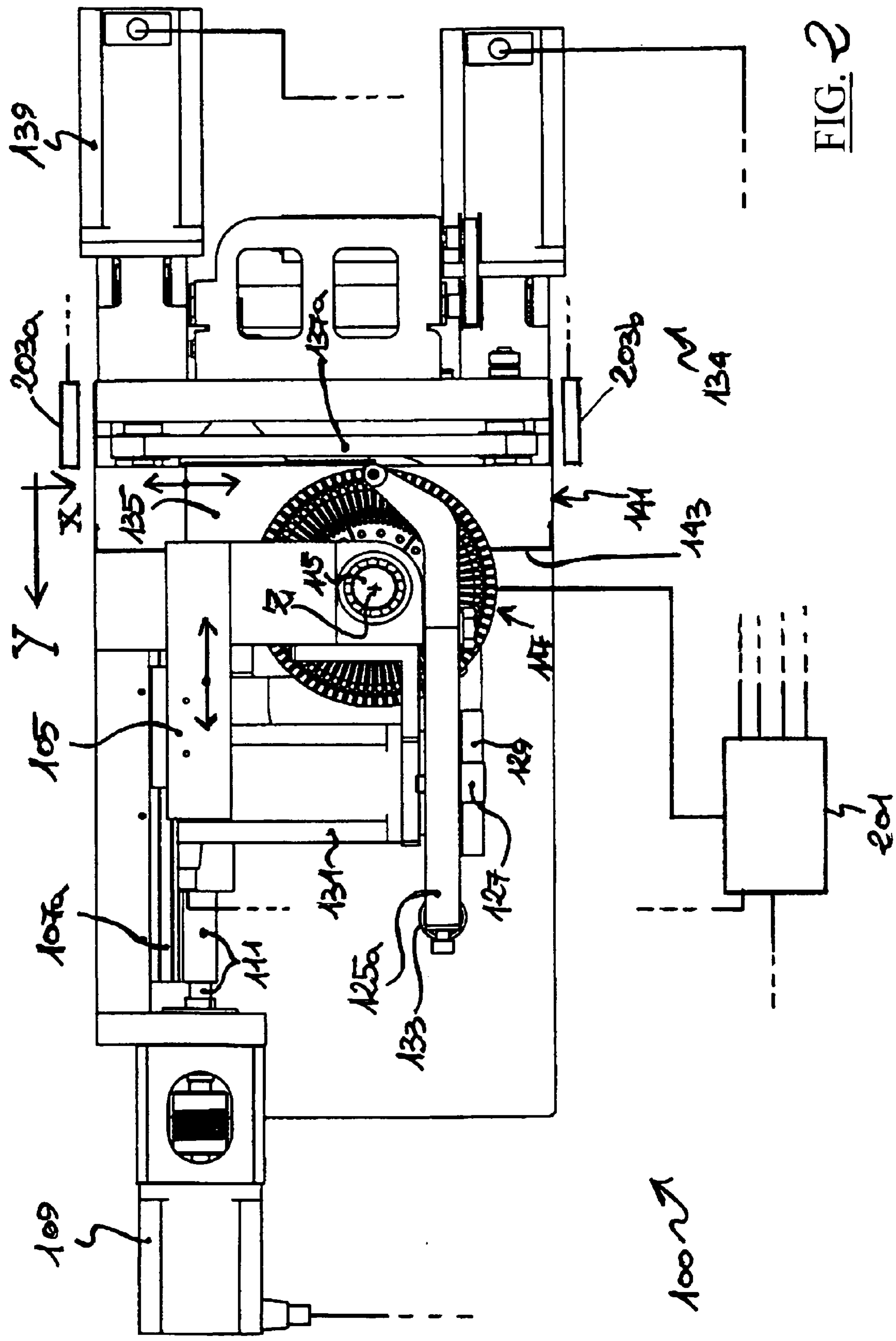
FIG. 2 is a schematic plan view of the card mechanical personalization unit shown in FIG. 1.
Figure 3:
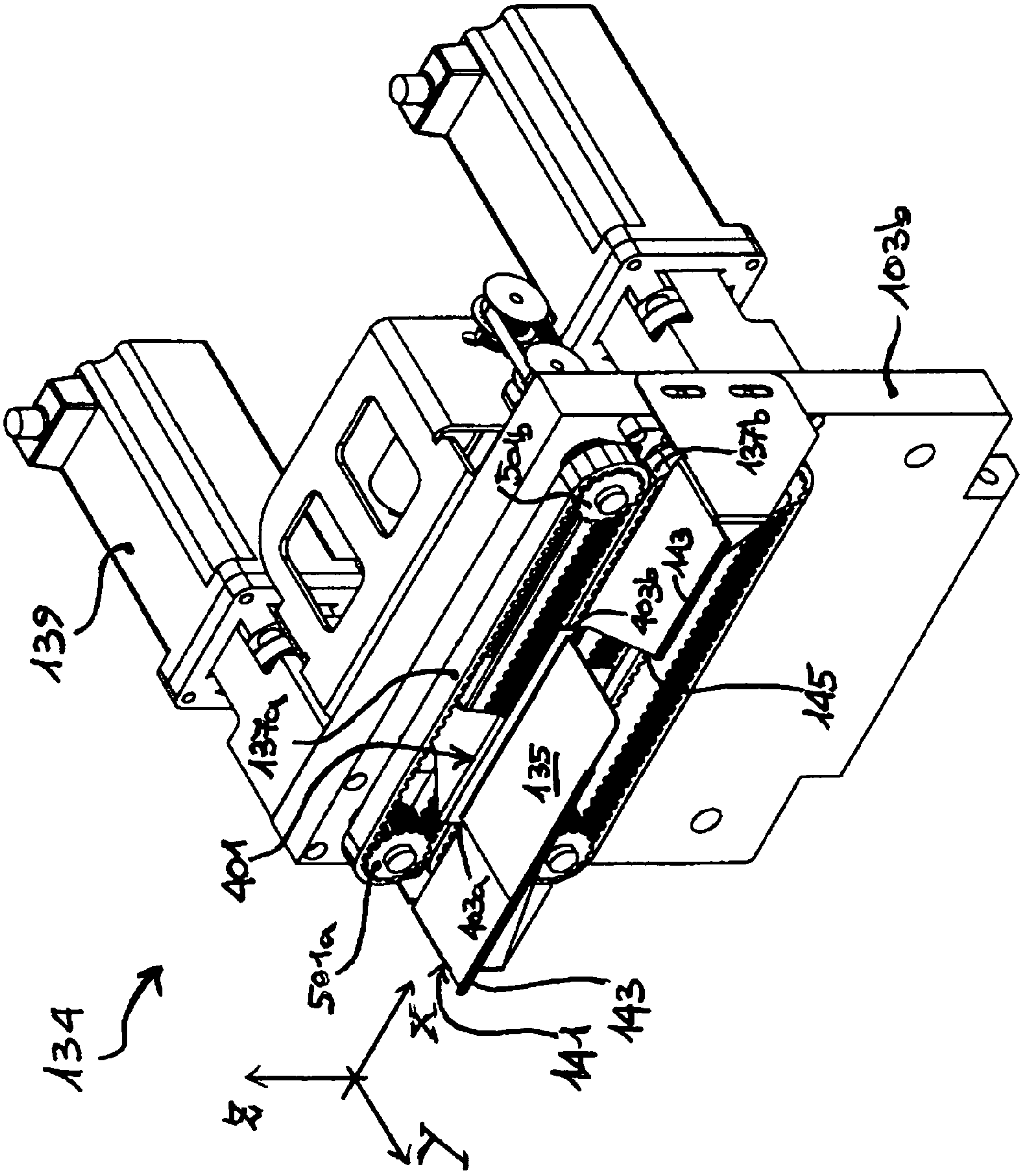
FIG. 3 is a schematic axonometric view of a moving and positioning device of the card to be embossed, part of the card mechanical personalization unit of the preceding figures, in an embodiment of the present invention.
Figure 4:
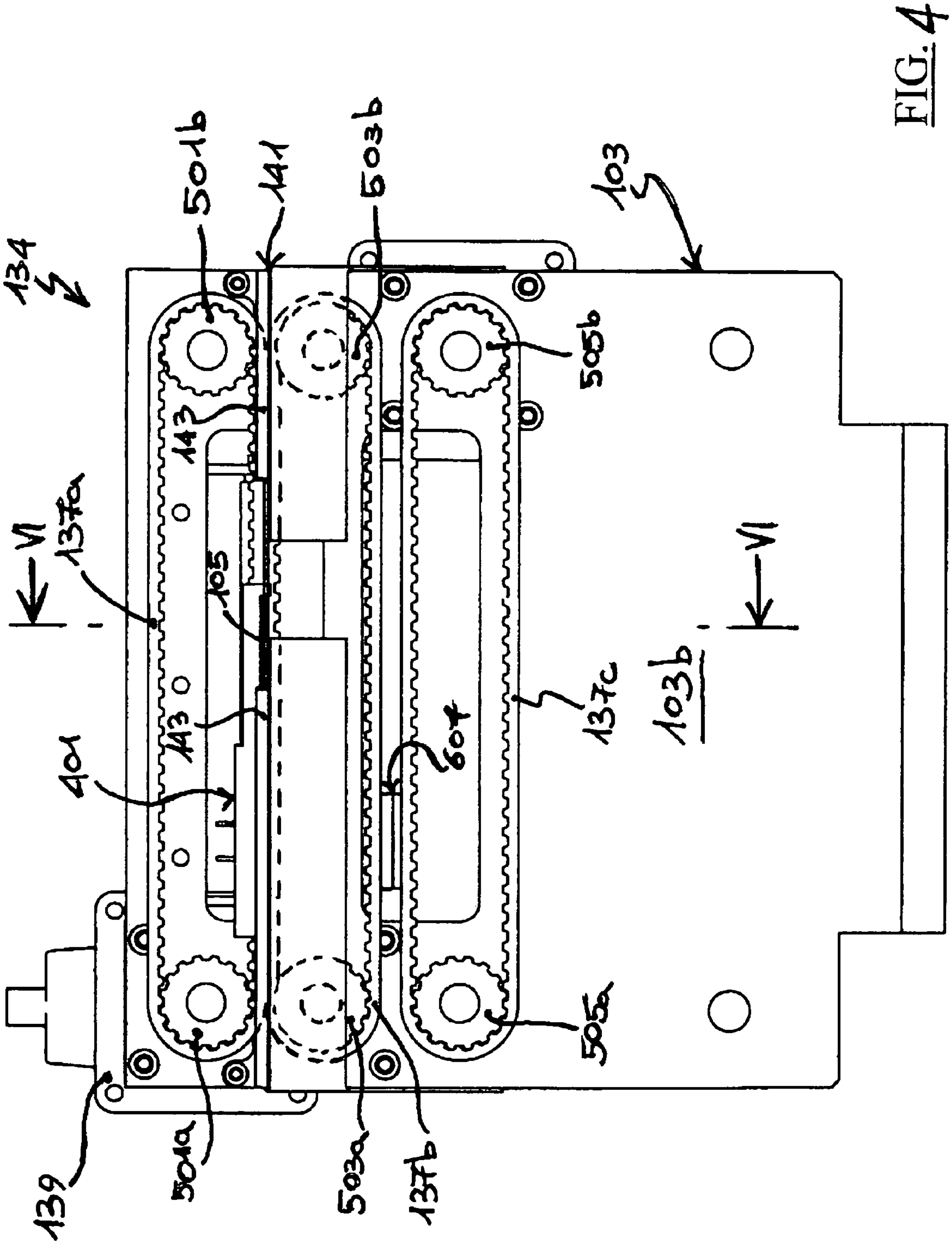
FIG. 4 is a schematic front view of the card moving and positioning device of FIG. 3.

With reference to the drawings, and particularly to FIGS. 1, 2 and 3, a mechanical personalization unit according to an embodiment of the present invention, for the mechanical personalization of supports for identification cards, particularly an embossing machine unit, is denoted globally by 100 and comprises a frame 103 intended to sustain, in a static or movable way, the different parts constituting the embossing machine unit.

Particularly, the frame 103 sustains slidably a sleigh 105. The sleigh 105 is slidable in a vertical plane along a pair of parallel guides 107*a* and 107*b*, fixed to a vertical panel 103*a* of the frame 103. The sleigh 105 is actuated in translation so as to slide along the guides 107*a* and 107*b* by a first electric motor 109, for example of the stepping type, mounted to the panel 103*a* of the frame 103; particularly, a shaft of the motor 109 is coupled to the sleigh 105 through a screw-nut screw coupling type 111, although other types of coupling are clearly possible, for example one involving a belt and pulleys.

From the sleigh 105, a shelf 113 horizontally extends that rotatably supports an end 115 of a vertical hub of a characters-supporting drum 117. The characters-supporting drum 117, substantially of circular shape, is activatable in rotation, around a vertical axis (by convention, referred to in the following as the Z axis) by an electric motor 119, integrally moving together with the sleigh 105, whose shaft 121 constitutes, or to whose shaft 121 there is mounted, the hub of the characters-supporting drum 117. Alternatively, rather than having the drum 117 directly mounted on the shaft 121 of the motor 119, motion transmission means can be provided, for example, a belt and pulleys transmission, a gear transmission and the like.

The characters-supporting drum 117 includes an upper ring and a lower ring, superimposed in the direction of the Z axis, separated by an annular interspace 123. Along the external edges of the upper and lower rings, a circumferential succession of pairs of conjugated punch and matrix elements is arranged; each punch-matrix pair is adapted to the realization, by embossing (on a support, typically of a plastic material, used for realizing the credit/debit card) of a particular alphabetical or numerical character or, in general, a particular symbol. Each punch-matrix pair is individually activatable for the embossing of the respective character/symbol by a percussion member comprising a pair of upper 125*a* and lower 125*b* rocking levers; each rocking levers 125*a* and 125*b* brings, at a respective end overlying and, respectively, underlying the edge of the upper 117*a* and, respectively, lower ring 117*b*, a respective striker adapted to act in percussion on the punch and, respectively, on the matrix of the punch-matrix pair that, in a given time instant, is placed in an active position, i.e., in correspondence of the strikers of the rocking levers 125*a* and 125*b*. The rocking levers 125*a* and 125*b* are hinged in an intermediate point thereof to brackets integrally moving together with the sleigh 105. In proximity of the end opposite to the end that is provided with the strikers, the rocking levers 125a and 125b are additionally provided each with a respective pin 127, adapted to cooperate with a cam 129, mounted on a shaft activatable in rotation by an electric motor 131, for example of the stepping type, fixed in turn to the sleigh 105. Elastic return-action means, for example a spiral spring 133, act substantially on said opposed ends of the rocking levers 125a and 125b to bias the respective strikers towards a moved-way condition, in the direction of the Z axis, from the edges of the respective ring 117a and 117b. The rocking levers 125a and 125b thus act as cam followers in respect of the cam 129.

The embossing machine unit 100 further includes, arranged frontally to the sleigh 105 and to the characters-supporting drum 117, a device, denoted globally with 134, for transporting or moving and for positioning a card 135 to be embossed, for moving the card along the direction of an axis identified by convention with X in the drawings, lying in a horizontal plane and along which, in use, the longer side of the card to be submitted to embossing extends; the card moving device 134 allows positioning the card 135, having generically rectangular shape (the standard ISO 7810 prescribes that the card has to have rectangular shape, with longer and shorter sides of prescribed length, particularly 86 mms by 54 mms), with respect to the characters-supporting drum 117, so as to realize on the card 135 strings of embossed characters aligned to the longer side of the card 135.

As better visible in FIGS. 3 to 6, in an embodiment of the present invention the moving and positioning device 134 of the card 135 comprises a pair of belts 137a, 137b, that extend, one superimposed to the other in the direction of the Z axis, along the direction of the X axis. The two belts 137a and 137b, particularly but not limitatively internally toothed belts, extend, and are more or less stretched, between respective pairs of wheels 501a, 501b and 503a, 503b, in the example cogwheels, rotatably supported by a panel 103b of the frame 103.

One of the cogwheels, in the example the cogwheel 501a, is mounted on a shaft of an electric motor 139, for example of the stepping type, and it is activatable in rotation by the motor 139; the cogwheel 501b, associated with the motorized wheel 501a, is idle and is dragged in rotation through the belt 137a wound thereon. One of the two cogwheels 503a and 503b, for example the wheel 503a, is operationally coupled to the motorized wheel 501a through suitable motion transmission means, for example a belt transmission (not visible in the drawings), arranged on the rear of the panel 103b, and it is therefore indirectly operated by the same motor 139 that operates in rotation the cogwheel 501a; as the cogwheel 501b, also the cogwheel 503b is idle and is dragged in rotation by the belt 137b wound thereon. The two belts 137a and 137b can in this way be actuated in rotation, through the single motor 139. It is additionally underlined that nothing prevents from providing a separate motor, similar to the motor 139, for driving autonomously (but synchronously with the rotation of the wheels 501a and 501b) the rotation of one of the two cogwheels 503a and 503b.

The two belts 137a and 137b, or at least their backside (corresponding to the belt external side, opposite to that provided of teeth), are realized in, or lined by, a material with relatively high friction coefficient, for example rubber. For example, it is possible to use commercially-available toothed belts, with AT5 profile, whose back is lined by a material of high friction coefficient, for example nitrile rubber.

The distance, along the Z axis, between the centers of the two pairs of cogwheels 501a, 501b and 503a, 503b is such that the external surface of the lower horizontal segment of the upper belt 137a and the external surface of the upper horizontal segment of the lower belt 137b are in proximity relationship with each other, substantially in contact to each other, or, at most, such surfaces are reciprocally distanced, in the vertical direction, of a sufficiently small distance, and particularly a distance lower or at most equal to the typical thickness of the card 135, so that the card can be held by friction between the two belts 137a and 137b.

Frontally to the two belts 137a and 137b, between these and the characters-supporting drum 117, a shelf 141 extends in a horizontal plane and in the direction of the axis X, the shelf 141 being mounted to the panel 103b. The upper surface of the shelf 141, located at a height substantially correspondent to that of the external surfaces of the vertically facing, horizontal segments of the belts 137a and 137b, forms a support and sliding plane for the card 135. Particularly, the shelf 141, of width substantially correspondent to the dimension of the shorter side of the card 135 (the side that, in use, extends in the direction of the Y axis), is provided, along the end thereof distal from the panel 103b, of an upwardly-facing ridge 143, for the containment of the card 135 in the direction of the Y axis and for guiding the card in the movement along the X axis. Additionally, in correspondence of the characters-supporting drum 117, the shelf 141 includes a substantially "V"-shaped notch 145, with opening facing the characters-supporting drum 117, so as to allow the action on the card 135 of the punch-matrix pairs of the drum 117.

The embossing machine unit 100, and, particularly, the motors 109, 119, 131 and 139 are controlled by a control unit, represented in extremely schematic way in FIG. 2 and identified therein by 201. Particularly, the control unit 201 can for example include a personal computer of industrial type, suitably programmed for performing a prescribed manufacturing program of the card. The motors 109, 119, 131 and 139 are all equipped with suitable means, typically encoders, adapted to detect and furnish to the control unit 201 information on the angular position of the motors. Moreover, as schematically shown in FIG. 2, at least at the entry of the embossing machine unit 100, or, preferably, both at the entry and at the exit thereof, means 203a and 203b are provided for, for example optical means such as photodetectors, adapted to detect the transit of the card 135; thanks to the information furnished by the card detectors means 203a and 203b and from the encoder associated with the motor 139, the control unit 201 is capable of calculating, at each time instant, the position of the card 135 in the direction of the X axis.

The arrangement of the pair of belts 137a and 137b is thus such as to allow the belts 137a and 137b to hold, between the two external surfaces of the vertically facing, horizontal segments of the belts, and simply by way of friction, the card 135 to be submitted to embossing. The activation of the motor 139 determines the sliding of the two belts 137a and 137b in one or in the other of the two senses of the X axis, and therefore the moving of the card (a longitudinal strip of the upper surface of which, and a corresponding strip of the lower surface being) held by friction between the belts 137a and 137b. In the movement along the X axis, the card 135 is guided by the shelf 141 and by the respective ridge 143. It is thus possible to load a new card 135 to be embossed and to position it with respect to the drum 117. Simultaneously, the activation of the motor 109 determines the movement of the sleigh 105 in the two senses of the Y axis, for the correct positioning of the drum 117 with respect to the card 135 in the direction of the Y axis; the activation of the motor 119 determines the rotation of the drum 117 about the Z axis, for the selection the desired character to be embossed: the corresponding punch-matrix pair is brought in active position, in correspondence of the strikers of the rocking levers 125*a*, 125*b*. The activation of the motor 131 determines, by rotation of the cam 129, the driving of the strikers provided at the ends of the rocking levers 125*a* and 125*b*; such strikers, striking the selected punch-matrix pair, which has been brought in active position, determine the embossing of the selected character on the surface of the card.

In other words, the selection of the point of the card surface, along the X axis, where to emboss a character is performed by the belts 137*a* and 137*b*, while the selection of the surface point where to emboss the character along the Y axis is performed by the sleigh 105, that causes the drum 117 to translate. The rotation of the drum 117 about the Z axis allows selecting the character to emboss.

In a preferred embodiment of the present invention, the device 134 for moving and positioning the card also comprises, in association with the two belts 137*a* and 137*b*, an arrangement of elements adapted to guarantee that the card 135, once captured by the belts 137*a* and 137*b* and held by friction between the external surfaces of the respective, facing horizontal segments of the belts, is correctly moved, and particularly that to a given rotation angle of the motor 139, in a sense or in the other, there corresponds a prescribed displacement of the card 135 along the X axis, in such a way as to avoid that possible losses of adherence, and consequent skids of the surfaces of the belts 137*a* and 137*b* on the card 135 (possible because of dirt, deterioration of the belts, high moving speed of the card 135) cause an incorrect positioning of the card 135 with respect to the drum 117.

In an embodiment of the present invention, more clearly visible in FIGS. from 3 to 6 and 7A, 7B, there is therefore provided an element 401, movable towards/far from the upper surface of the shelf 141 and extending in the direction of the X axis for a segment of length generically correspondent to the length of the longer side of the card 135. The element 401 is provided, at the two ends thereof along the X axis, of two projections 403*a* and 403*b*, that substantially define therebetween a light space of length equal to the length of the longer side of the card 135: in such a way, the element 401 defines a fork whose legs 403*a* and 403*b*, when the element 401 is lowered onto the upper surface of the shelf 141, are adapted to cooperate with the two opposite short sides of the card 135, extending in the direction of the Y axis, so as to hold the card 135 against undesired movements in the direction of the X axis.

Figure 5:
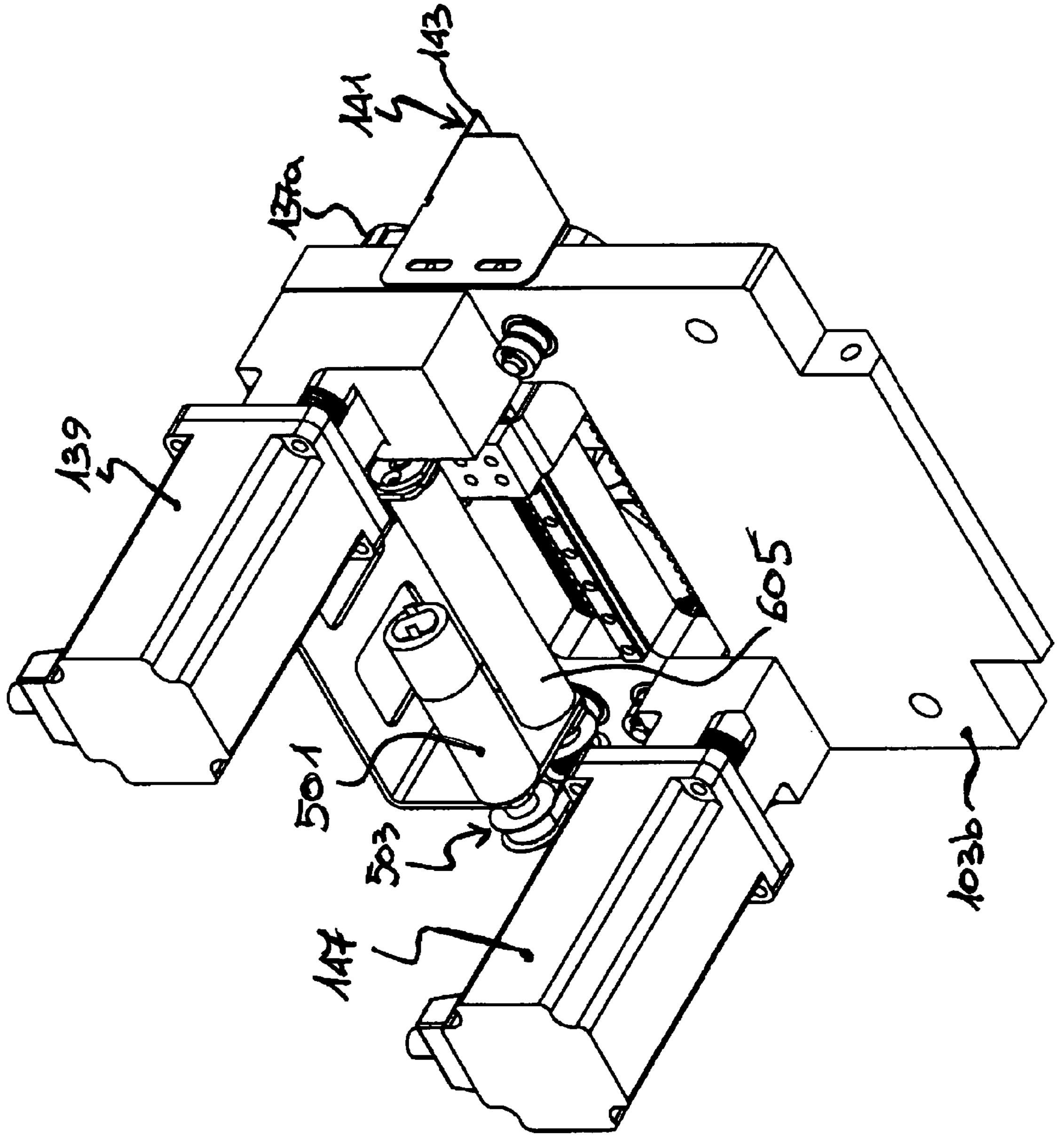
FIG. 5 is a schematic axonometric view from behind of the card moving and positioning device of FIG. 3.
Figure 6:
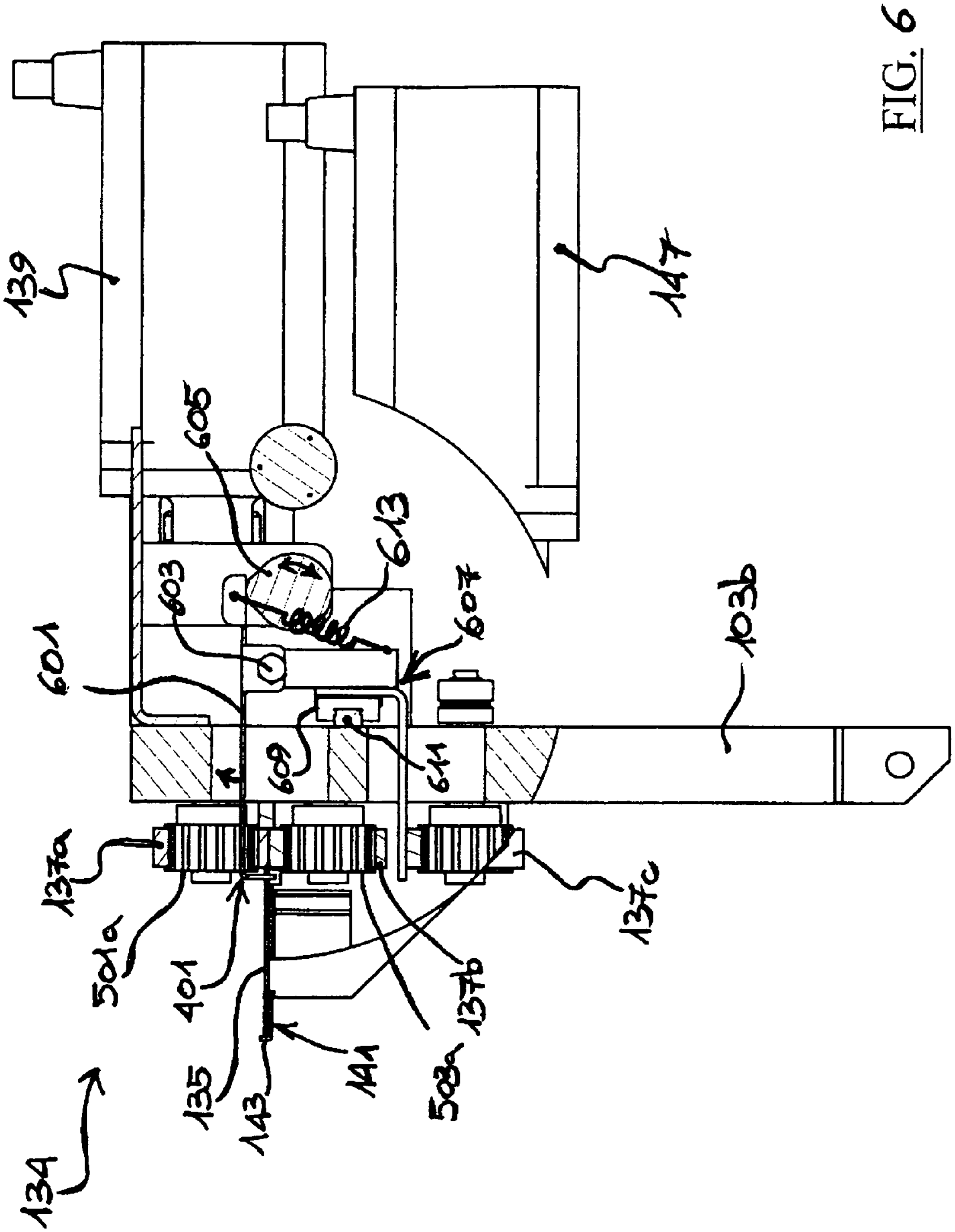
FIG. 6 schematically shows, in a sectional view along the plane VI—VI of FIG. 4, an arrangement of side-retention elements of the card, being part of the card moving device of FIGS. 4 and 5.
Figure 7A:
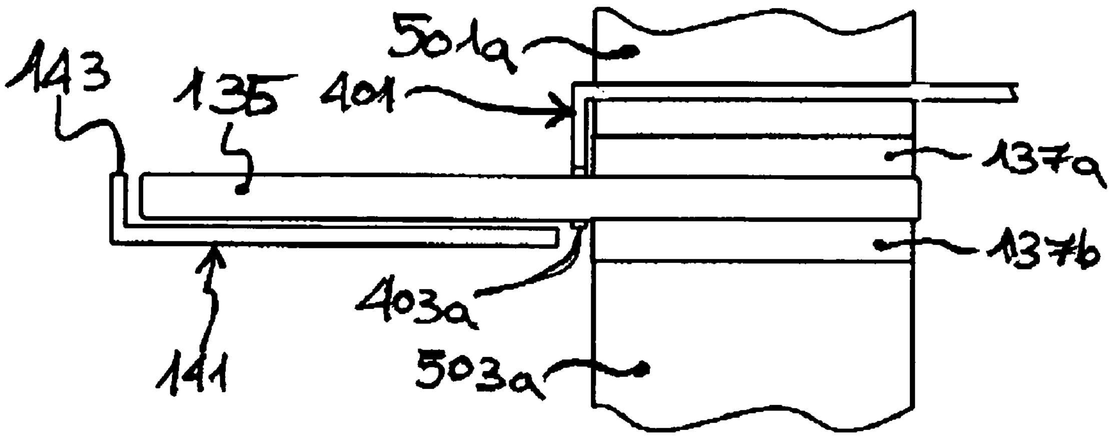
FIGS. 7A and 7B show, schematically, the arrangement of the card side-retention elements, in two operating positions.
Figure 7B:
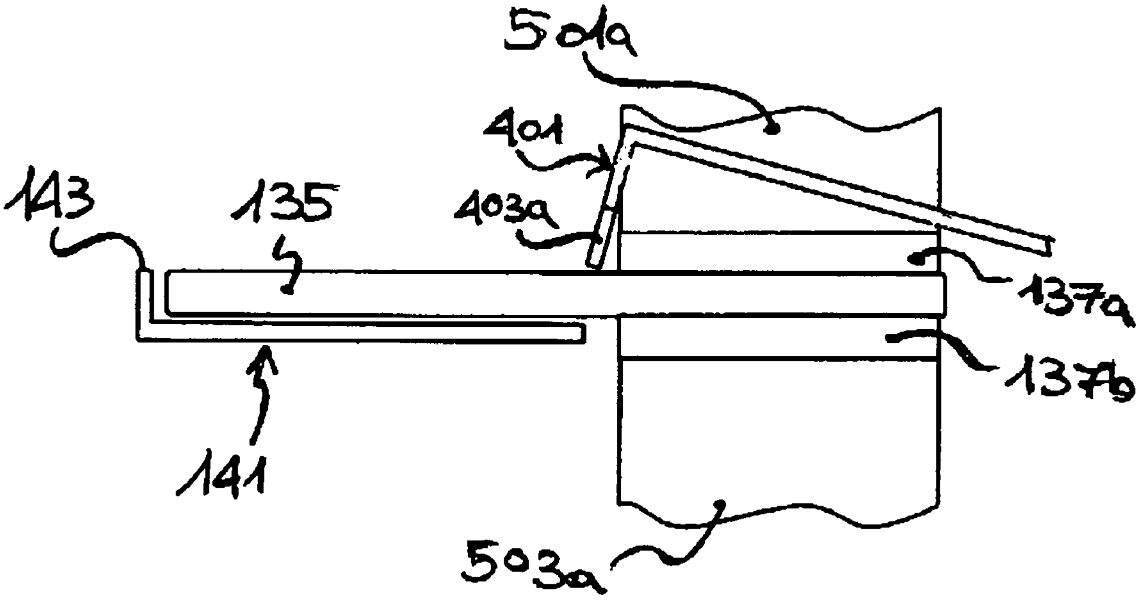

The fork element 401, in addition to being movable towards/far from the upper surface of the shelf 141, is further also movable in the direction of the X axis. Making reference to FIGS. 6, 7A and 7B, the element 401 is for example constituted by a metal sheet properly shorn and folded, so as to form, in addition to the fork above described, an appendix 601 extending transversally to the direction of the X axis toward the back of the panel 103*b*, and hinged in 603. Behind the panel 103*b*, a cam element 605, visible also in FIG. 5, is arranged so as to act on a free end of the appendix 601, to determine the rotation of the element 401 about 603, and therefore the movement of the front part of the element 401 towards/far from the upper surface of the shelf 141. Suitable elastic biasing means, for example a helical spring 613 (in alternative, a spiral spring wound around the axis of rotation of the element 401), assure that the free back end of the appendix 601 is kept in contact with the cam 605, behaving therefore as a cam follower. The cam element 605, a cylinder with suitable eccentricity, is operated for example in rotation by a respective electric motor 501 (visible in FIG. 5), also controlled by the control unit 201, through a suitable belt transmission identified globally by 503. In alternative to the motor 501 and to the cam 605, the movement of the element 401 towards/far from the shelf 141 can be driven by a magnet, elastic biasing means being provided, for example a spiral spring, for biasing the element 401 in one of the two positions. For the movement in the direction of the X axis, the fork element 401 is rigidly joined, through an assembly of brackets identified globally by 607, to a further belt 137*c*, similar to the belts 137*a* and 137*b*, and, as these latter, extended and more or less stretched between a respective pair of cogwheels 505*a* and 505*b* (FIG. 4) that are rotatably supported by the panel 103*b*. One of the two cogwheels 505*a*, 505*b*, in the example the wheel 505*a*, is a drive wheel, operated in rotation by an electric motor 147, for example a stepping motor similar to the motor 139, and controlled by the control unit 201 (with the aid of a respective encoder, not visible in the drawings). The other wheel 505*b* is idle and dragged in rotation by the belt 137*c*. The movement in the direction of the X axis of the fork element 401 is guided by a sliding block 609, mounted to the assembly of brackets 607 and sliding along a guide 611 associated with the panel 103*b*.

Figure 8A:
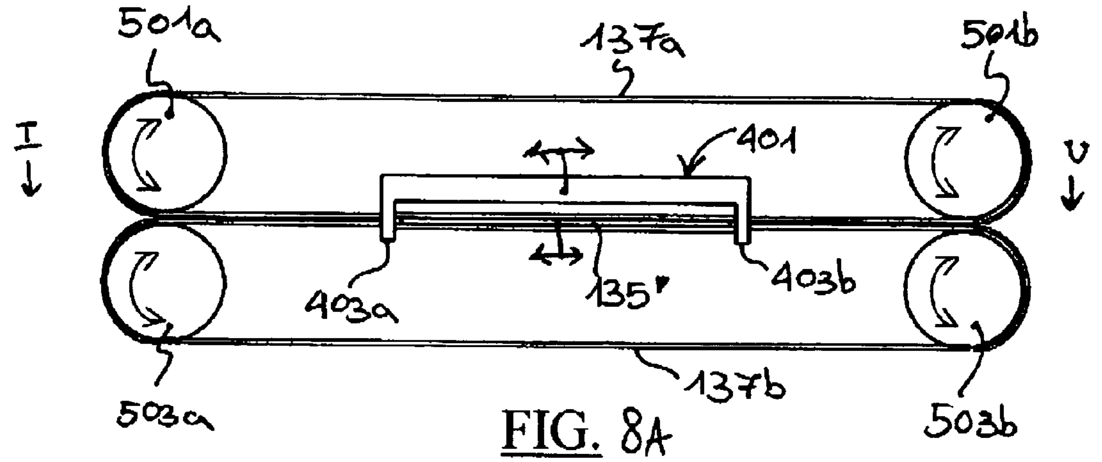
FIGS. 8A, 8B and 8C are extremely simplified front views of the card moving and positioning device, in three different operating phases.
Figure 8B:
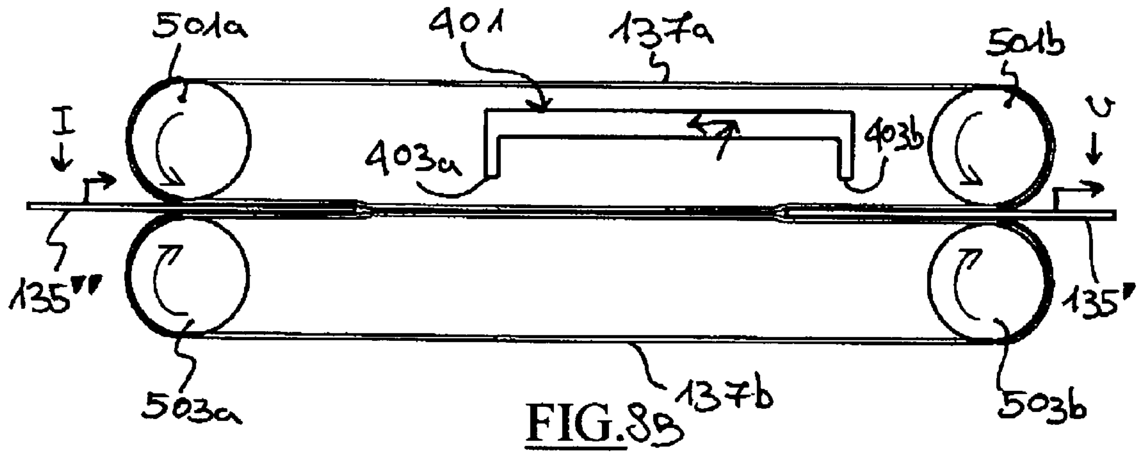
Figure 8C:
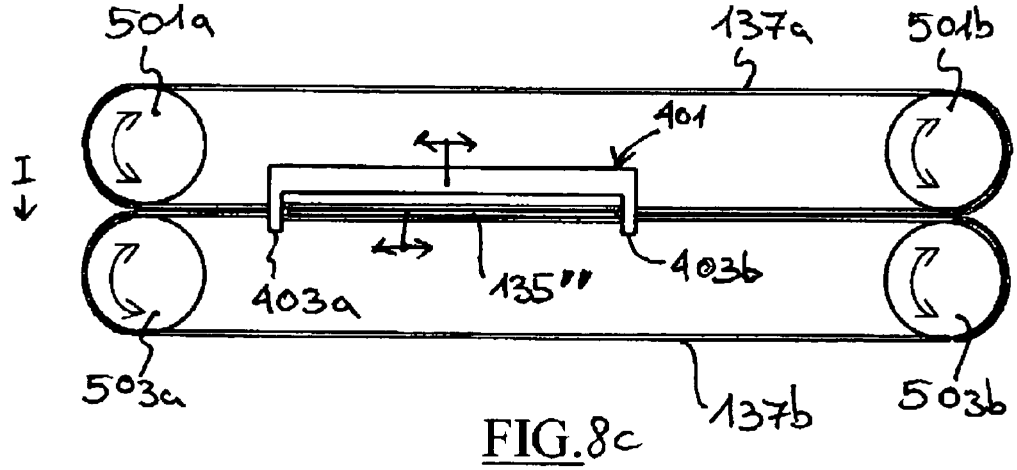

With reference to FIGS. 8A, 8B and 8C, in operation, the control unit 201 determines, through the motor 501 and the cam 605, the lowering and the lifting of the fork element 401 with respect to the shelf 141. When the fork element 401 is in the lowered position (active position) to hold one card 135' in the embossing phase, the control unit 201 operates the motors 139 and 147 synchronously, so that the fork element 401, dragged by the belt 137*c*, follows the card 135' in the movement thereof along the X axis, determined by the belts 137*a* and 137*b* (FIG. 8A). Once the embossing of the card 135' is completed, the fork element 401 is lifted and brought into the inactive position, so as to free the card 135'; through the belts 137*a* and 137*b*, the card 135' can in this way be brought toward the exit U of the embossing machine unit 100, while the fork element 401, movable independently with respect to the belts 137*a* and 137*b* thanks to the provision of the motor 147, is brought toward the entry of the embossing machine unit 100 (FIG. 8B); simultaneously, the same movement of the belts 137*a* and 137*b* that determines the transport of the embossed card 135' toward the exit U also allows beginning the loading of a new card 135" to be embossed, arriving at the entry I. While the new card 135" is loaded, the fork element 401 is brought to the entry I of the embossing machine unit, and when the fork element 401 has reached the correct position with respect to the card 135", it is lowered and brought therefore in the active position, to laterally retain the new card 135" during the embossing process (FIG. 8C). From this time on, for the whole embossing phase of the card 135", the fork element 401 is moved synchronously to the card 135".

In other words, the moving and positioning device 134 of the card 135 is able to carry on, substantially in parallel, the unloading of one card 135' already personalized mechanically, and the loading of a new card 135" to be personalized, realizing in this way a significant saving of time with respect to the traditional card moving devices.

In a preferred embodiment of the present invention, the control unit 201 implements a program such that the angular speed of the punching cam 129, whose rotation determines the driving of the rocking levers 125*a* and 125*b*, and therefore of the relative strikers, can vary, for the purpose of dilating the time intervals during which the rocking levers are not operated, and therefore to prolong the time interval between two subsequent activations of the strikers, so as to adapt to the time necessary for positioning of the card and for the selection of the character to be embossed.

Figure 9A:
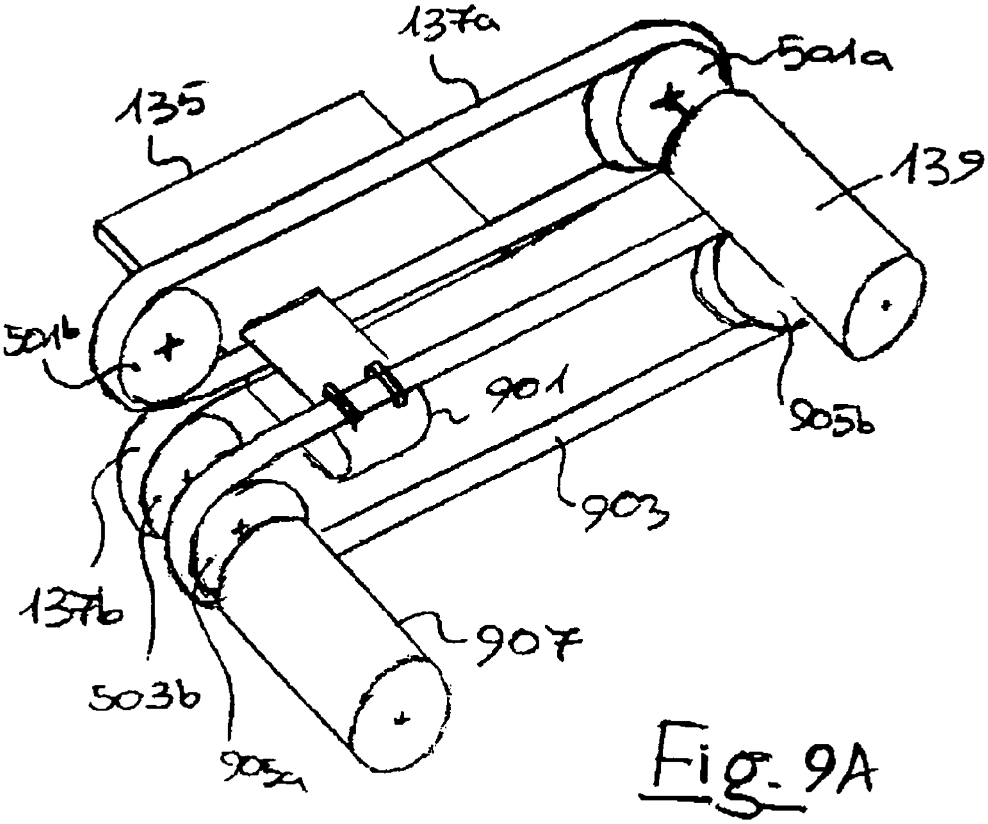
FIGS. 9A, 9B and 10 show, in an extremely simplified way, two alternative embodiments of the arrangement of side-retention elements of the card to be mechanically personalized.
Figure 9B:
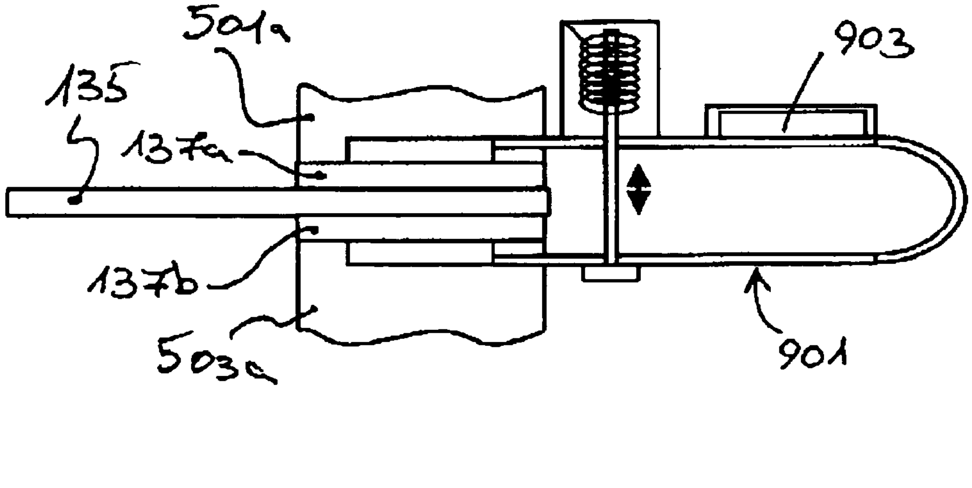

Alternative embodiments of the longitudinal-retention member of the cards against possible friction losses and skids of the belts 137*a* and 137*b* are clearly possible. For example, as shown in way extremely stylized in FIG. 9, the fork element 401 can be replaced by a clamp element 901, in the form of tweezers, adapted to act in compression on the inner surfaces of the facing segments of the belts 137*a* and 137*b* between which the card 135 is interposed. In a way similar to the fork element 401, the clamp element 901 is mounted to a belt 903, for example internally toothed, extending between two cogwheels 905*a* and 905*b*, one of which, for example the wheel 905*a*, is actuated in rotation by a respective electric motor 907, for example of the stepping type, controlled by the control unit 201. In order to activate the element 901 so as to clamp the two horizontal belt segments, suitable actuator means are provided, schematically shown in FIG. 9B, comprising for example an electromagnetic actuator mounted to a leg of the element 901 and actuating in translation a little shaft coupled to the other leg, so as to bring towards/far from each other the two legs of the element 901, for compressing/releasing the facing segments of the belts 137*a* and 137*b*.

Compared to the fork element 401 of the preceding embodiment, the clamp element 901 simplifies the control to be operated by the unit 201, not being necessary to precisely know the position of the card; it is in fact enough that the clamp element 901 be positioned in intermediate position along the longer side of the card 135.

Figure 10:
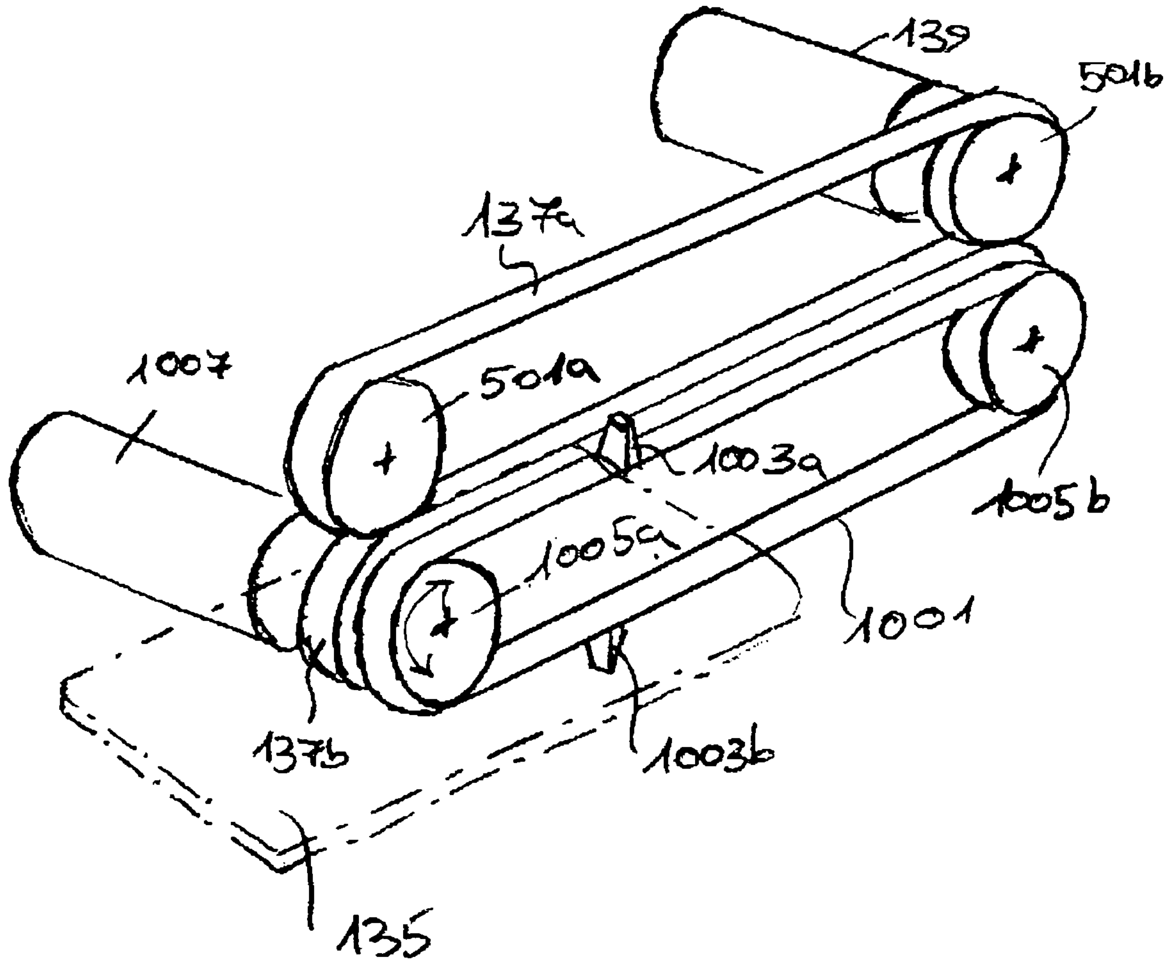

Another possible embodiment is shown in FIG. 10, in which the card 135 retention member comprises a belt 1001, similar to the belts 137*a* and 137*b* and arranged substantially in front of the belt 137*b*. The belt 1001, extended and more or less stretched between two wheels 1005*a* and 1005*b*, one of which driven by a motor 1007 and the other idle, is provided with two projections 1003*a* and 1003*b*, projecting from the external surface thereof, located at a distance (along the belt 1001) substantially equal to the longitudinal dimension of the card 135. When a new card 135 is to be loaded, the control unit 201 operates the motor 1007 so as to make the belt 1001 slide counterclockwise (while the belt 137*b* slides clockwise), up to the point of bringing one of the two projections 1003*a*, 1003*b* in abutment against the transversal entry edge of the card 135. At this point, the belt 1001 is made to rotate synchronously to and in the same sense as the belt 137*b*, thus causing the other projection 1003*b* to be brought in abutment against the other transversal edge of the card 135. From this time on, the two projections 1003*a* and 1003*b* hold the card 135 against possible skids of the belts 137*a* and 137*b*.

Compared to the two preceding embodiments, this embodiment of the side-retention element of the card is very simple from the constructive point of view.

Figure 11:
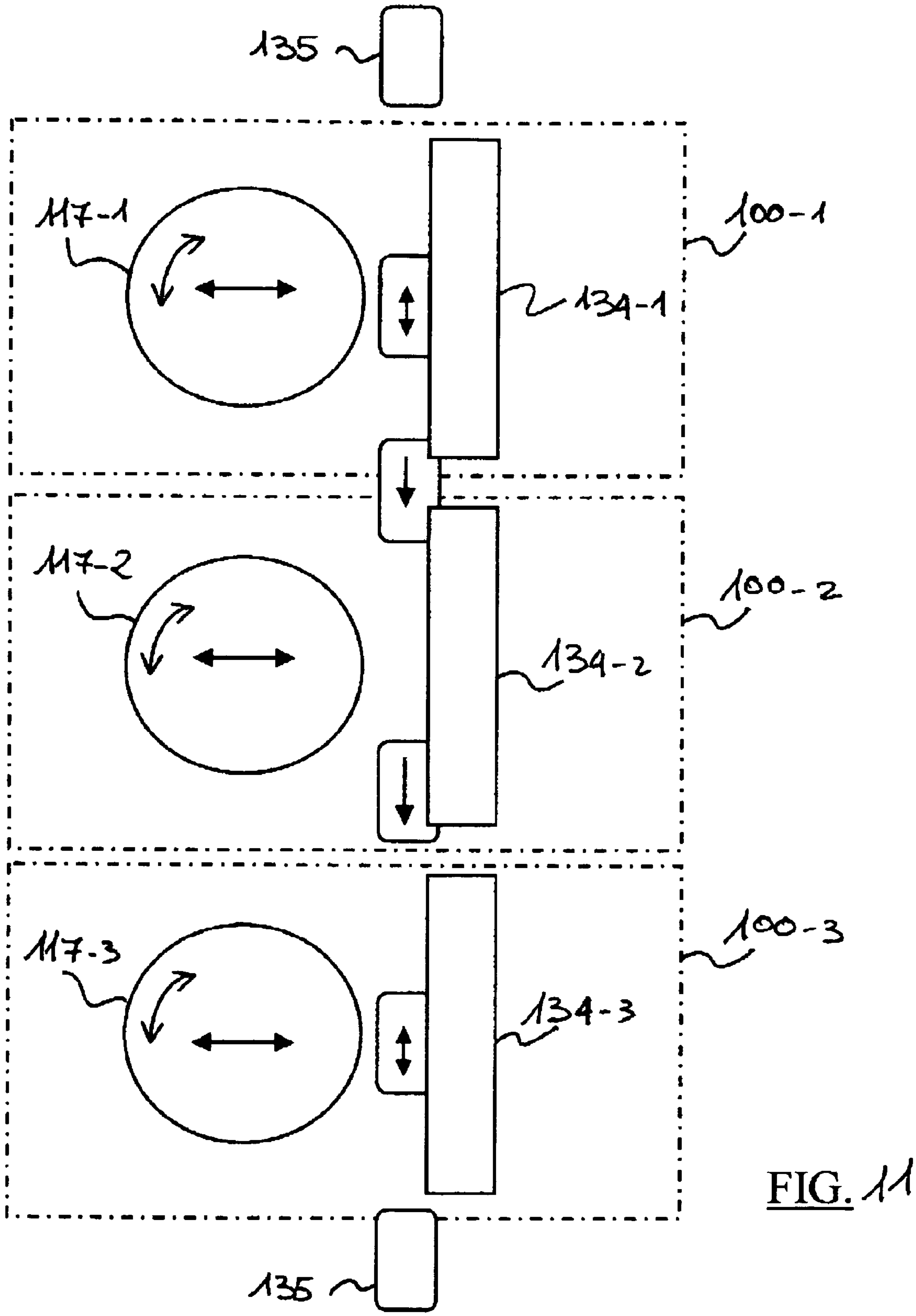
FIG. 11 is an extremely simplified top-plan view of a card mechanical personalization station composed by a plurality of personalization units of the type shown in the preceding figures, arranged in series.

Finally, in FIG. 11 there is shown, in an extremely stylized way, an embossing machine composed by two or more, in the example three, embossing machine units 100-1, 100-2, 100-3 of the type described in the foregoing. In this case, it is possible to appreciate the advantages that derive from having, in each embossing machine unit 100-1, 100-2, 100-3, a device 134-1, 134-2, 134-3 for moving and positioning the card that calls for moving the cards only along the X axis (and not, as in the traditional devices, along the two axis X and Y), while the positioning of the character to be embossed transversally to the axis X, i.e. in the direction of the Y axis, is achieved moving the characters-supporting drum 117-1, 117-2, 117-3 (i.e., moving the respective sleigh 105). In fact, since the cards 135 move in straight line along the X axis, the transfer of the card from an embossing machine unit to the following one is easy and straightforward, not requiring, for the loading/unloading of the card, the re-positioning of the same in a predetermined position in the direction of the Y axis. Additionally, by providing a number of embossing machine units in cascade equal to the number of lines of strings of characters to be embossed on the card, it is no more even necessary to move the different characters-supporting drums 117-1, 117-2, 117-3 in the direction of the Y axis: each characters-supporting drum can be positioned at the proper distance relative to the axis of movement of the card 135 so as to realize a respective line of characters. In any case, even if the number of embossing machine units is lower than the number of different lines of characters to be realized on the card, the provision of a plurality of embossing machine units in cascade allows limiting the movement in the direction of the Y axis of the single characters-supporting drum, each of which can be for example devoted to the realization of few, for example two, adjacent lines of characters on the card, with line spacing of the order of about ten millimeters.

Although described in connection with the mechanical personalization through embossing of the cards, the present invention is also applicable to other typologies of mechanical personalization of the cards, for example of the type by incision, in which the characters are engraved through a die on the active surface of the card, and simultaneously inked by interposition of an inking ribbon between the die and the active surface of the card.

It is pointed out that experimental trials conducted by the Applicant on prototype machines have evidenced that it is not essential that the belts are excessively stretched. Additionally, the provision of the side-retention arrangement for retaining the cards against skids may be dispensed for; however, the provision of such an arrangement may in some cases be preferable.

The present invention has been herein described in terms of some possible embodiments thereof. It is clear that those skilled in the art can bring several changes to the embodiments described, as well as conceive other embodiments of the present invention, without for this reason departing from the scope of the invention defined in the appended claims.

What is claimed is:

1. Machine for the mechanical personalization of supports adapted to be used as identification cards, comprising:

a mechanical personalization group of the card, adapted to interact with a card to be mechanically personalized so as to realize, on a surface of the card, strings of symbols, and a card moving and positioning device of the card to be mechanically personalized relative to said mechanical personalization group, wherein said moving and positioning device of the card comprises a pair of belt elements extended and jointly movable along a first direction of a plane containing the card to be personalized, said belt elements being arranged at a mutual distance, in a second direction orthogonal to said plane, such as to allow said pair of belt elements receiving, accommodating and holding therebetween by friction the card to be personalized, and retaining means activatable for holding the card present between the two belt elements against skids, so that the card is moved in the first direction integrally with the belt elements.

2. The machine according to claim 1, in which said pair of belt elements includes a pair of belts extending parallelly in said first direction and having respective facing surfaces cooperating for accommodating and holding the card, said cooperating facing surfaces being realized in a material having relatively high friction coefficient.

3. The machine according to claim 1, in which said retaining means include a member activatable for cooperating with the two opposite edges of the card transversal to said first direction.

4. The machine according to claim 1, in which said retaining means include clamp means activatable for acting in compression on the two belt elements holding the card therebetween.

5. The machine according to claim 1, in which said mechanical personalization group is movable in a second direction, transversal to said first direction, so as to realize on the card strings of symbols extending parallelly in said first direction.

6. The machine according to claim 1, in which said mechanical personalization group includes punches activatable by striker means to determine, by plastic deformation of the surface of the card, the realization of said symbols, said striker means being brought by a rocking lever operated by cam means, and in which the speed of rotation of said cam means is variable.

7. The machine according to claim 1, comprising at least two groups of mechanical personalization, each one associated with a respective card moving device, said at least two groups, and associated card moving devices, being arranged in succession along a line of mechanical personalization of the card aligned with said first direction.

8. Machine for the mechanical personalization of supports adapted to be used as identification cards, comprising:

a mechanical personalization group of the card, adapted to interact with a card to be mechanically personalized so as to realize, on a surface of the card, strings of symbols, and a card moving and positioning device of the card to be mechanically personalized relative to said mechanical personalization group, wherein said moving and positioning device of the card comprises a pair of belt elements extended and jointly movable along a first direction of a plane containing the card to be personalized, said belt elements being arranged at a mutual distance, in a second direction orthogonal to said plane, such as to allow said pair of belt elements receiving, accommodating and holding therebetween by friction the card to be personalized, and wherein said mechanical personalization group is movable in a second direction, transversal to said first direction, so as to realize on the card strings of symbols extending parallelly in said first direction.

9. Machine for the mechanical personalization of supports adapted to be used as identification cards, comprising:

a mechanical personalization group of the card, adapted to interact with a card to be mechanically personalized so as to realize, on a surface of the card, strings of symbols, and a card moving and positioning device of the card to be mechanically personalized relative to said mechanical personalization group, wherein said moving and positioning device of the card comprises a pair of belt elements extended and jointly movable along a first direction of a plane containing the card to be personalized, said belt elements being arranged at a mutual distance, in a second direction orthogonal to said plane, such as to allow said pair of belt elements receiving, accommodating and holding therebetween by friction the card to be personalized, and wherein said mechanical personalization group includes punches activatable by striker means to determine, by plastic deformation of the surface of the card, the realization of said symbols, said striker means being brought by a rocking lever operated by cam means, and in which the speed of rotation of said cam means is variable.

* * * * *